June 27, 1961 J. O. PREISIG 2,990,445

COLOR TELEVISION RECEIVER COMBINATION DEMODULATOR AND MATRIX

Filed Nov. 14, 1955

INVENTOR.
JOSEPH O. PREISIG
BY
[signature]
ATTORNEY

United States Patent Office 2,990,445
Patented June 27, 1961

2,990,445

COLOR TELEVISION RECEIVER COMBINATION DEMODULATOR AND MATRIX

Joseph O. Preisig, Trenton, N.J., assignor to Radio Corporation of America, a corporation of Delaware
Filed Nov. 14, 1955, Ser. No. 546,677
3 Claims. (Cl. 178—5.4)

This invention relates to demodulator circuits and more particularly to matrix demodulators which provide a trio of color difference signals from a chrominance signal.

The composite color television signal which was approved by the Federal Communications Commission on December 17, 1953, includes a luminance signal, a chrominance signal, color synchronizing bursts and deflection synchronizing signals. The luminance signal contains information indicative of the monochrome information of the televised image. The chrominance signal is a modulated subcarrier containing modulations representative of color difference signals. Color difference signals describe how each color in the televised image differs from the corresponding color content of the luminance signal; color television signals may be demodulated from the chrominance signal by synchronous demodulation, that is, by heterodyning the chrominance signal with an accurately phased demodulating signal having a phase corresponding to the desired color difference signal.

In some types of color television receivers it is desirable to synchronously demodulate only a pair of color difference signals with a third color difference signal produced from this pair by combination of proper amplitudes and polarities of each of the demodulated pair of color difference signals. This has the advantage of reducing the required circuit components in the chrominance channel of the color television receiver thereby simplifying its design and reducing its cost.

It is an object of this invention to provide an improved demodulator circuit for developing a trio of color difference signals from a chrominance signal.

It is another object of this invention to provide an improved two-demodulator circuit which is cross-coupled to produce a trio of color difference signals.

According to the invention, each of a pair of demodulator tubes are utilized to demodulate a color difference signal from a chrominance signal. The space charge distribution of current in each of the demodulator tubes is controlled between a pair of electrodes in a manner whereby opposite polarities of the demodulated color difference signals are developed which are thereupon added together to form a third color difference signal.

Other and incidental objects of this invention will become apparent upon a study of the following specification and an inspection of the drawings where:

Figures 1, 2, 3:
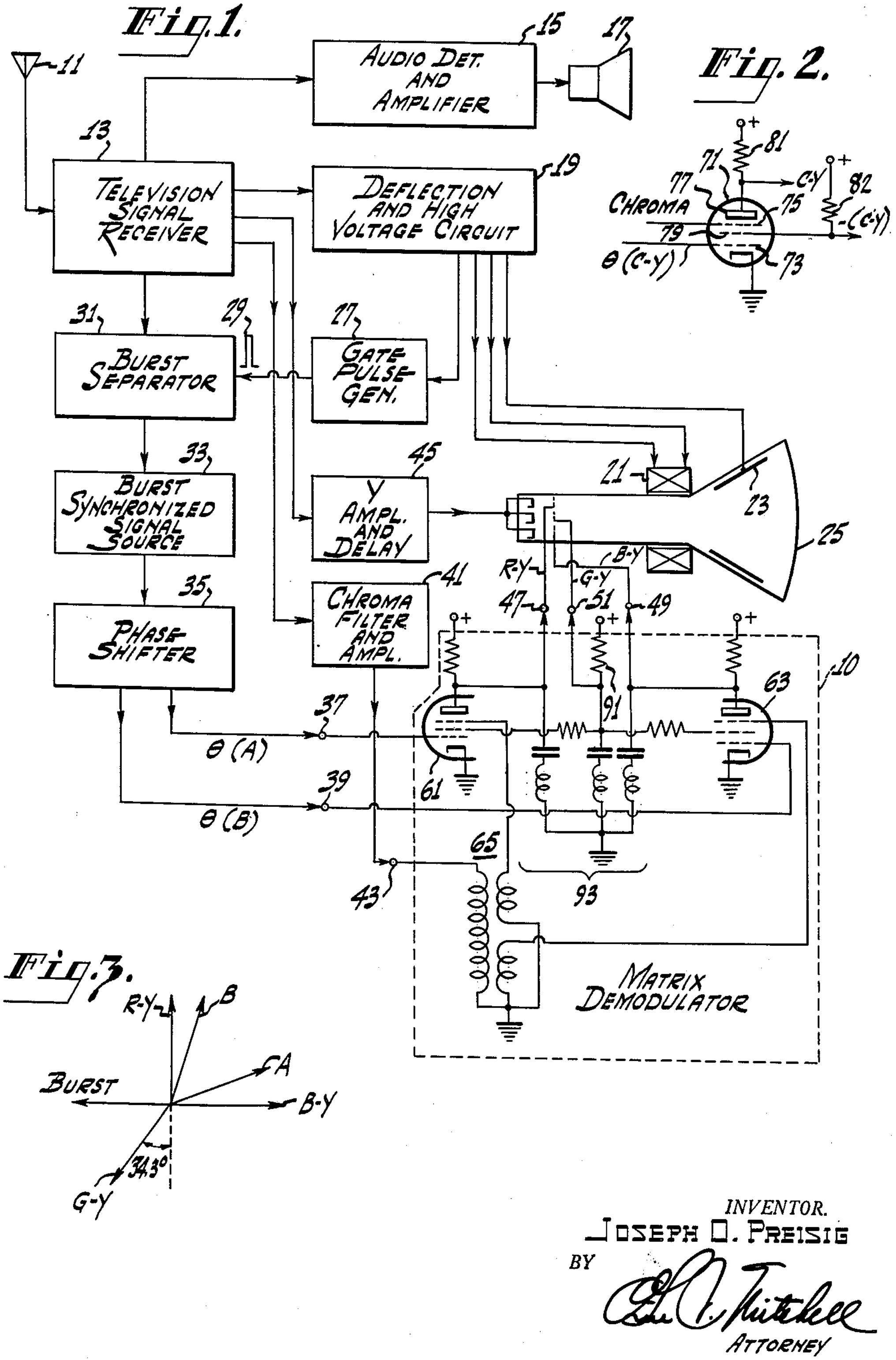
FIGURE 1 is a block diagram of a color television receiver including a schematic diagram of one form of the present invention.
FIGURE 2 is a schematic diagram of a demodulator tube utilizing space charge distribution control techniques for producing both positive and negative polarities of a demodulated color difference signal.
FIGURE 3 is a vector diagram relating the phases of selected color difference signals whose modulations are included in the chrominance signal.

The circuit of FIGURE 1 is a television receiver which employs a matrix demodulator 10 which functions according to the present invention.

In the color television receiver circuit of FIGURE 1, an incoming signal from a broadcast transmitter is applied to the antenna 11 and therefrom applied to the television signal receiver 13. The television signal receiver 13 employs a first detection circuit, an intermediate frequency amplifier and a second detection circuit to demodulate the color television signal from the incoming signal. The demodulated color television signal also includes a frequency modulated sound carrier which is transmitted 4½ mcs. removed from the picture carrier. Utilizing, for example, an intercarrier sound circuit, the sound information is demodulated and amplified in the audio detector and amplifier 15 and therefrom applied to the loud speaker 17.

The color television signal is applied to the deflection and high voltage circuits 19 which separate the deflection synchronizing signals from the color television signal and develop vertical and horizontal deflection signals and also a high voltage. The vertical and horizontal deflection signals are applied to the yoke 21; the high voltage is applied to the ultor 23 of the color image reproducer 25. The deflection and high voltage circuits also energize the gate pulse generator 27 which may be in the form of a multivibrator responsive to horizontal synchronizing pulses or may be an auxiliary winding on the transformer of the high voltage circuits. The gate pulse generator produces a gate pulse 29 having a duration interval substantially the same width as and coinciding in time with the duration interval of the color synchronizing bursts.

The color television signal and the gate pulse 29 are applied to the burst separator 31 which separates the bursts from the color television signal and applies the separated bursts to the burst synchronized signal source 33. The burst synchronized signal source is a circuit which, responsive to the phase information conveyed by the color synchronizing bursts, develops a reference signal having the frequency of the bursts and an accurately maintained phase. The reference signal from the burst synchronized signal source is thereupon applied to the phase shift circuits 35 which produce a pair of demodulating signals at the output terminals 37 and 39. The phases of the signals developed at the output terminals 37 and 39 will be discussed in terms of the operation of the matrix demodulator 10 later in the specification.

The color television signal is applied to the chroma filter and amplifier 41 which selects a prescribed frequency range of chrominance signal information, hereinafter referred to as the chroma, from the color television signal and applies the chroma signal to the input terminal 43 of the matrix demodulator 10.

The color television signal which constitutes principally luminance signal information when not subjected to synchronous demodulation is applied to the Y amplifier and delay line 45, from which circuit the amplified luminance signal is applied to the cathodes of the color image reproducer 25. The matrix demodulator 10 provides R–Y, B–Y and G–Y color difference signals at the output terminals 47, 49 and 51, respectively, from which terminals the aforementioned color difference signals are applied to the control electrodes of the color image reproducer 25. The luminance signal and the color difference signal are added together in the electron guns of the color image reproducer 25 to impress modulations on the electron beams of the image reproducer 25 which represent the component color signals which describe the transmitted or televised color image. It is to be appreciated that the addition of the luminance information and the respective color difference signals can be performed in separate adder circuits without departing from the spirit of the present invention. The matrix demodulator 10 functions according to the present invention in the following fashion: the matrix demodulator 10 accepts the chrominance signal at the input terminal 43 and a pair of demodulating signals at the terminals 37, 39 of the phase shifter 35, and develops an R–Y, B–Y and G–Y color difference signal at each of the terminals 47, 49, 51 respectively.

The matrix demodulator 10 utilizes a pair of multicontrol grid tubes 61 and 63. The chroma signal is applied to each of the third grids of tubes 61 and 63 by way of the transformer 65. The synchronous demodulating signal developed at the terminal 37 is applied to the first control grid of the tube 61; the synchronous demodulating signal at the terminal 39 is applied to the first control grid of the tube 63. In both tubes 61 and 63 interaction between the chrominance signal and the synchronous demodulating signal applied to these tubes is produced therein providing demodulated color difference signals corresponding to the phases of the synchronous demodulating signals in the anode circuits of these tubes. Before considering in detail the requirements of the phases of the synchronous demodulation signals so that the desired color difference signals will be produced at the output terminals 47, 49 and 51, consider the operation of the circuit shown in FIGURE 2. The circuit of FIGURE 2 includes an electron tube 71 of, say, of the 6AS6 variety, having a first control electrode 73 to which a C–Y phased synchronous demodulating signal is applied, C representing any desired color. The electron tube 71 also includes a third control grid 75 to which the chroma signal is applied. The third control grid performs the function of space charge distribution, that is to say, it controls the distribution of space between the anode 77 and the screen grid 79. When the potential of the third grid 75 is sufficiently high, most of the space charge current which is controlled by the first control grid 73 passes to the anode with a reduced amount of space charge current passing to the screen grid 79. However, when the potential of the third grid 75 is sufficiently low, only a small amount of current or none at all is permitted to pass to the anode with an increasingly large amount or all of the space charge current passing to the screen grid. Variations of potential on the third grid 75, therefore, cause variations in the distribution of the space charge current between the anode 77 and the screen grid 79. It is to be noted that variations of space charge current reaching the anode 77 will be 180° out of phase or of reversed polarity with respect to the variations in the amount of space charge current reaching the screen grid 79. When the interaction of the C–Y phase demodulating signal and the chroma signal takes place in the electron stream of the electron tube 71, it follows therefore that a C–Y phased color difference signal will be developed across the output resistor 81 and a C–Y color difference signal of reversed phase will be developed across the resistor 82, which is coupled to the screen grid 79.

It follows, therefore, that a tube such as the electron tube 71, can be utilized to develop at each of a pair of output electrodes, both positive and negative polarities of a demodulated color difference signal. Each of the tubes 61 and 63 of the matrix demodulator 10 functions in this fashion.

FIGURE 3 is a vector diagram relating the phases of pertinent color difference signals in the chrominance signal to the phase of the color synchronizing bursts. It is seen from FIGURE 3 that the phase of the R–Y color difference signal in the chrominance signal lags the burst phase by 90° with the phases of the B–Y and G–Y color difference signals lagging the R–Y color difference signal phase by 90°, and 213.4°, respectively. Assume, first, that a signal having an R–Y phase is applied to the first control grid tube 61 and that a synchronous demodulating signal having a B–Y phase is applied to the first control grid of the tube 63. If the screen grids of tubes 61 and 63 are decoupled, it follows then that an R–Y signal will be developed at the output terminal 47 and a B–Y color difference signal will be developed at the output terminal 49. At the same time, an R–Y color difference signal of reversed polarity will be developed at the screen grid of tube 61 and a B–Y color difference signal of reversed polarity will be developed at the screen grid of tube 63. It is seen from an inspection of the vector diagram of FIGURE 3 that by combining proper magnitudes of B–Y and R–Y color difference signal information of negative polarity, a G–Y color difference signal may be formed. It follows, therefore, that, for example, the screen grids of tubes 61 and 63 may be coupled to have a common output resistor 91 across which suitable amplitude of R–Y and B–Y color difference signal information of reversed polarity may be added together to form a G–Y color difference signal at the output terminal 51. However, one aspect to the behavior of tubes 61 and 63 when their screen grids have a common cathode resistor 91 must be taken into consideration. The R–Y color difference signal of negative polarity developed at the screen grid of tube 61 will be introduced into the electron stream of tube 63 and therefore also caused to be developed at the output terminal 49. In like fashion, B–Y color difference signal information of negative polarity will be introduced into the electron stream of tube 61 and caused to appear at the output terminal 47. By adopting the phases of the synchronous demodulating signal so that a synchronous demodulating signal corresponding to phase A of FIGURE 3 is applied to the terminl 39 and a synchronous demodulating signal of phase B of FIGURE 3 is applied to the input terminal 37, synchronous demodulation by tube 61 will thereupon yield not only R–Y color difference signal information, but also a sufficient amount of +(B–Y) color difference signal information. The B–Y color difference signal information will cancel the B–Y color difference signal information of negative polarity produced at terminal 47 by tube 63 to thereby yield a pure R–Y color difference signal at the output terminal 47. In like fashion, the adoption of the A synchronous demodulating signal phase for the tube 63 will cause that tube to synchronously demodulate both a B–Y color difference signal and a proper amount of R–Y color difference signal information to cancel the R–Y color difference signal information of negative polarity which is introduced into an electron stream of tube 63 by the screen grid circuit of tube 61. It follows, therefore, that the adoption of signal phases A and B will therefore produce uncontaminated color difference signals, namely, R–Y, B–Y and G–Y color difference signals at the output terminals 47, 49 and 51, respectively.

The traps 93, each tuned to 3.58 mcs., provide a typical means for eliminating components in the vicinity of the frequency of the chrominance signal carrier from the R–Y, G–Y and B–Y color difference signals applied to the color kinescope 25.

It is to be appreciated that the chrominance signal can be applied to the first control grid and the demodulator signal to the space charge distribution grid of each of tubes 61 and 63 without departing from the invention. It is to be further appreciated that although the circuit of FIGURE 1 has shown the demodulated signals subjected to phase shifting, in another embodiment of the present invention, the chrominance signal applied to the grids of tubes 61 and 63 may be phase shifted relative to the phase of the reference signal applied directly to these tubes from the burst synchronized signal source 33.

Having described the invention, what is claimed is:

1. In a color television receiver or the like, a source of a chrominance signal, a source of burst-synchronized reference oscillations, phase shifter means coupled to said source of oscillations to provide phase shifted oscillations at a phase B lagging the phase of the R–Y information in the chrominance signal and to provide phase shifted oscillations at a phase A leading the phase of the B–Y information in the chrominance signal, first and second amplifier devices each including a cathode, first, second and third grids, and an anode, means to apply said chrominance signal in the same phase to the third grids of both of said amplifier devices, means to apply said oscillations at phase A to the first grid of said first device, means to apply said oscillations at phase B to the first grid of said second amplifier device, a G–Y demodulated signal output circuit coupled to the second grids of both amplifier devices, an R–Y demodulated signal output circuit coupled to the anode of said first device, and a B–Y demodulated signal output circuit coupled to the anode of said second device.

2. In a color television receiver or the like, a source of a chrominance signal, a source of burst-synchronized reference oscillations, phase shifter means coupled to said source of oscillations to provide phase shifted oscillations at a phase B lagging the phase of the R–Y information in the chrominance signal and to provide phase shifted oscillations at a phase A leading the phase of the B–Y information in the chrominance signal, first and second amplifier devices each including a cathode, two control electrodes and two collector electrodes, means to apply said chrominance signal in the same phase to corresponding control electrodes of both of said amplifier devices, means to apply said oscillations at phase A to the other control electrode of said first device, means to apply said oscillations at phase B to the other control electrode of said second amplifier device, a G–Y demodulated signal output circuit coupled to corresponding output electrodes of both amplifier devices, an R–Y demodulated signal output circuit coupled to the other output electrode of said first device, and a B–Y demodulated signal output circuit coupled to the other output electrode of said second device.

3. In a color television receiver including a source of a chrominance signal comprising phase and amplitude modulated color subcarrier waves, the modulation of said color subcarrier waves being such that demodulation of said waves at a first predetermined phase will produce an R–Y signal, demodulation of said waves at a second predetermined phase will produce a B–Y signal, and demodulation of said waves at a third predetermined phase will produce a G–Y signal, said receiver also including a source of reference oscillations of color subcarrier frequency, and color image reproducing apparatus adapted to reproduce color images in response to the delivery of R–Y, B–Y, and G–Y signals, respectively, to respective first, second, and third input terminals thereof, a color demodulator arrangement comprising in combination: first and second electron discharge devices each including a cathode, a pair of control grids, a screen grid intermediate the control grids of said pair, and an anode; means coupled to said chrominance signal source for applying said chrominance signal to one of said pair of control grids of said first electron discharge device and to one of said pair of control grids of said second electron discharge device; means coupled to said source of oscillations for applying said reference oscillations to the other of said pair of control grids of said first electron discharge device in a fourth predetermined phase intermediate said first and second phases; means coupled to said source of oscillations for applying said reference oscillations to the other of said pair of control grids of said second electron discharge device in a fifth predetermined phase intermediate said fourth and second phases; means intercoupling the screen grids of said first and second electron discharge devices for permitting sufficient signal crosstalk therebetween to effect development of said R–Y signal at the anode of said first electron discharge device and to effect development of said B–Y signal at the anode of said second electron discharge device; said crosstalk permitting means comprising first and second impedances connected in series between the respective screen grids, and a third impedance connected between the junction of said first and second impedance and a point of reference potential, the relative values of said impedances being chosen to effect development of said G–Y signal at said junction; means for coupling said first device anode to said first input terminal; means for coupling said second device anode to said second input terminal; and means for coupling said junction to said third input terminal.

References Cited in the file of this patent

UNITED STATES PATENTS

| | | |
|---|---|---|
| 2,725,422 | Stark et al. | Nov. 29, 1955 |
| 2,779,818 | Adler et al. | Jan. 29, 1957 |
| 2,845,481 | Lockhart | July 29, 1958 |

OTHER REFERENCES

Radio-Electronics, page 33, May 1955.